United States Patent [19]

Uchida et al.

[11] Patent Number: 5,003,020

[45] Date of Patent: Mar. 26, 1991

[54] DIALLYL TEREPHTHALATE PREPOLYMER AND PROCESS FOR PRODUCING SEAM

[75] Inventors: Hiroshi Uchida; Shigehiro Chaen; Kuniomi Marumo, all of Oita, Japan

[73] Assignee: Showa Denko K.K., Tokyo, Japan

[21] Appl. No.: 235,599

[22] Filed: Aug. 24, 1988

[30] Foreign Application Priority Data

Aug. 24, 1987 [JP] Japan ................... 62-208282
Aug. 24, 1987 [JP] Japan ................... 62-208283

[51] Int. Cl.$^5$ ........................... C08F 118/16
[52] U.S. Cl. ...................... 526/322; 526/210; 526/212
[58] Field of Search ........................ 526/322

[56] References Cited

U.S. PATENT DOCUMENTS

| | | | |
|---|---|---|---|
| 3,096,310 | 7/1963 | Herberger | 526/322 |
| 3,390,116 | 6/1968 | Porret | 526/322 |
| 3,474,127 | 10/1969 | Neri et al. | 526/322 |

*Primary Examiner*—Bernard Lipman
*Attorney, Agent, or Firm*—Sughrue, Mion, Zinn, Macpeak & Seas

[57] ABSTRACT

A diallyl terephthalate prepolymer consisting essentially of diallyl terephthalate monomer units, having
(a) 10 or less of the monomer units in the carbon-carbon bonded molecular chain portion which is composed of the allyl groups of the monomer units, and either
(b) an unsaturation in a range of from 40 to 70, as represented by an iodine value determined by the Wijs method,
(c) a number-average molecular weight in a range of from 6,000 to 10,000 as polystyrene, and a weight-average molecular weight in a range of from 10,000 to 70,000 as polystyrene, both being determined by gel permeation chromatography, and
(d) a melt viscosity in a range of from 30,000 to 90,000 CP at 170° C., as determined by a Koka flow tester, or
(b) an unsaturation in a range of from 50 to 80, as represented by an iodine value determined by the Wijs method,
(c) a number-average molecular weight in a range of from 8,000 to 20,000 as polystyrene, and a weight-average molecular weight in a range of from 30,000 to 90,000 as polystyrene, both being determined by gel permeation chromatography, and
(d) a melt viscosity in a range of from 20,000 to 90,000 CP at 130° C., as determined by a Koka flow tester.

5 Claims, 9 Drawing Sheets

DIALLYL TEREPHTHALATE PREPOLYMER AND PROCESS FOR PRODUCING SAME

BACKGROUND OF THE INVENTION

1. Field of the Invention

This invention relates to novel diallyl terephthalate prepolymer (hereinafter referred to as "DAT-P") and a process for producing the same by polymerizing diallyl terephthalate (hereinafter referred to as "DAT").

2. Description of the Related Art

Resin made by polymerization of diallyl phthalate (hereinafter referred to as "DAP") as the monomer, which is an isomer of DAT, has been highly rated for its stable electrical properties in a high-temperature, high-moisture atmosphere, and has found wide use in forming materials, laminates, and decorative laminates and the like.

Nevertheless, there is a growing demand for a greater heat-resistance of this resin while preserving the desired properties thereof, to enable a wider use thereof in machines and electrical parts.

In the production of a DAP resin, polymerization is temporarily discontinued before the polymer is substantially gelled, and the polymer thus produced is separated from the system as a prepolymer, which is then further polymerized, after a polymerization initiator or filler is added thereto, into the final product. This is because the monomer has two double bonds in the molecule thereof and thus tends to be gelled, in the ordinary polymerization process, before it is sufficiently polymerized. For such an approach to be economically viable, it is essential to be able to produce the prepolymer in an efficient manner, but at present, the prepolymer production process is not fully developed, and a more efficient approach has been demanded by industry.

Polymerization of DAT as the monomer, which is highly symmetrical, has a potential for the production of heat-resistant polymers but has not been commercialized because the cured product of DAT-P produced by the currently available process is fragile and generally has unsatisfactory mechanical properties.

The prepolymer is usually prepared by bulk polymerization, which uses no solvent, or solution polymerization with the aid of a variety of solvents. Bulk-polymerized prepolymer has a minimum iodine value of about 80, even when polymerization is effected immediately before gellation starts, and the weight-average molecular weight (Mw) thereof determined by gel permeation chromatography (GPC) is very high. The inventors have found that a prepolymer having an excessively high iodine number and Mw, when cured, does not improve the product properties; the major drawbacks of the polymer of hardness and fragility remain, and the viscosity during the forming process is increased to no useful purpose.

Solution polymerization, with the aid of a solvent such as benzene or ethyl acetate, is also known. A solution-polymerized prepolymer has a lower iodine number than a bulk-polymerized prepolymer but still has the above drawbacks, because the number of the monomer units in the carbon-carbon bonded molecular chain portion, which is composed of the allyl group for the monomer units, is still large.

Another approach to the production of a prepolymer which can provide a cured product having a high heat resistance and mechanical strength is a copolymerization of DAT and an aromatic hydrocarbon compound having at least one hydrogen atom on the benzyl position of toluene or xylene, as disclosed in Japanese Unexamined Patent Publication (Kokai) No. 59-80409. Such an approach, however, needs special considerations for the process and reactor; e.g., the monomer, polymerization initiator, and aromatic hydrocarbon compound must be injected from specially designed nozzles while being stirred at a high speed. Furthermore, large quantities of polymerization initiator are needed, and recycle of the monomer in a copolarization process is very difficult, although not impossible.

Still another approach is a polymerization of a halogenated hydrocarbon compound or aldehyde derivative having a relatively high chain transfer constant. One of the major problems involved in this approach is the production of radicals from the solvent, which tend to be added to the allyl group to initiate telomerization and degrade the polymer properties.

Diallyl isophthalate resin is known for a high heat-resistance, and is already produced on a commercial scale, but this is impracticable as the monomer is very expensive.

Use of a special monomer, such as naphthalenedicarboxylic acid diallyl ester, has been disclosed, but this monomer is also impracticably expensive.

All of the approaches described above can be improved from the viewpoint of the productivity of the prepolymer.

SUMMARY OF THE INVENTION

The inventors investigated the development of a polymerization process which uses inexpensive monomer as the feed to produce a heat-resistant polymer without any sacrifice of mechanical strength, and as a result, found that a prepolymer having a specific structure provides, when cured, a formed product having notably improved mechanical properties.

The newly developed process allows a production of a heat-resistant formed product which is equivalent to, or better than, a DAP resin in mechanical properties, via DAT-P produced by polymerizing DAT.

According to one feature of the present invention, the DAT-P, consisting essentially of diallyl terephthalate monomer units, has the following characteristic structures and properties:

a) the number of the monomer units in the carbon-carbon bonded molecular chain portion, which is composed of the allyl groups of the monomer units, is 10 or less;

b) the unsaturation is in a range of from 40 to 70, as represented by an iodine value determined by the Wijs method;

c) the number-average molecular weight is in a range of from 6,000 to 15,000 as polystyrene, and the weight-average molecular weight is in a range of from 10,000 to 70,000 as polystyrene, both being determined by gel permeation chromatography; and, d) the melt viscosity is in the range of from 30,000 to 90,000 CP at 170° C, as determined by a capillary rheometer, Koka flow tester.

According to another feature of the present invention, the DAT-P, consisting essentially of diallyl terephthalate monomer units, has the following characteristic structures and properties:

a) the number of the monomer units in the carbon-carbon bonded molecular chain portion, which is composed of the allyl groups of the monomer units, is 10 or less;

b) the unsaturation is in a range of from 50 to 80, as represented by an iodine value determined by the Wijs method;

c) the number-average molecular weight is in a range of from 8,000 to 20,000 as polystyrene, and the weight-average molecular weight is in a range of from 30,000 to 90,000 as polystyrene, both being determined by gel permeation chromatography; and, d) the melt viscosity is in the range of from 20,000 to 90,000 CP at 130° C, as determined by a Koka flow tester.

DESCRIPTION OF THE PREFERRED EMBODIMENTS

The Koka flow tester is a type of melt indexer, automatically recording the efflux rate curve, and is supplied by Shimadzu Co., Ltd.

The DAT-P having the above-described characteristic structures and properties is not known, and the inventors found that the use of such a polymer enables the production of a resin having improved mechanical properties, such as flexural strength and resistance to shock, while retaining the inherent properties of a diallyl terephthalate polymer, such as heat resistance. This is also completely unknown until now.

More specifically, the inventors found that the prepolymer having the characteristic structures and properties as mentioned above with respect to the first feature of the present invention is produced by polymerizing DAT under specific conditions using an aliphatic alcohol as the solvent, which has a solubility parameter (hereinafter referred to as "SP value") within a certain range, and that the prepolymer, when cured, gives a product having improved mechanical properties while retaining the inherent heat resistance.

The use of alcohol as the polymerization solvent for production of DAT-P is known, but is used merely to make polymerization reactions more controllable, as disclosed in Japanese Unexamined Patent Publication (Kokai) No. 49-97888, where the monomer is controlled at a high concentration above 40 wt% to prevent precipitation of the prepolymer and the temperature is kept at a relatively low level of around 100° C. At such a high monomer concentration, a poor solvent cannot easily produce the desired effects, as described later, and the properties of the resultant prepolymer are the same as those of the conventional resin.

The inventors found that the use of alcohol, as a poor solvent having a specific SP value, at a higher temperature and lower monomer concentration enables a production of a prepolymer having the characteristic structures and properties which, when cured, gives a product having notably improved properties. Production of the prepolymer under the given conditions also improves the polymerization conversion and makes the DAT-P easier to handle, and therefore, enhances the productivity of DAT-P.

More specifically, the newly developed solution polymerization process uses as the solvent an aliphatic alcohol which has an SP value in the range of from 21.0 to 27.0 $(MJ/cm^2)^{1/2}$, more preferably from 21.0 to 24.5 $(MJ/cm^2)^{1/2}$ Any type of alcohol can be used in the present invention, so long as it has an SP value within the above range. Preferably, it has a boiling point of 150° C or lower, more preferably of 120° C or lower, because a solvent having an excessively high boiling point is impracticable from the view point of the post-treatment after polymerization. The preferable aliphatic alcohols include: ethanol, isopropanol, n-propanol, sec-butyl alcohol, isobutyl alcohol, n-butyl alcohol. The more preferable alcohols are sec-butyl alcohol, isobutyl alcohol and n-butyl alcohol.

Another type of solvent, including an aromatic hydrocarbon such as benzene, toluene and xylene, aliphatic ketone such as acetone and methylethylketone, and aliphatic ester such as ethyl acetate, may be added to the alcohol solvent of the present invention, so long as it does not prove to be an impediment to the alcohol. The solvent for the present invention, however, is preferably essentially alcohol.

The prepolymer having the characteristic structures and properties as mentioned above with respect to the second feature of the present invention is produced by polymerizing under specific conditions using a cyclic ether such as dioxane or tetrahydrofuran as the solvent, and the resulting prepolymer, when cured, gives a product having improved mechanical properties while retaining the inherent heat resistance.

The use of cyclic ether as the polymerization solvent for production of DAT-P is not known, and in addition, it cannot be expected that the use of cyclic ether at a high temperature and lower monomer concentration enables a production of a prepolymer having the characteristic structures and properties which, when cured, gives a product having notably improved properties. Production of the prepolymer under the given conditions also improves the polymerization conversion.

Another type of solvent, including an aromatic hydrocarbon such as benzene, toluene and xylene, aliphatic ketone such as acetone and methylethylketone, and aliphatic ester such as ethyl acetate, may be added to the alcohol solvent of the present invention, so long as it does not prove to be an impediment to the cyclic ether. The solvent for the present invention, however, is preferably essentially cyclic ether.

It is necessary to control the monomer concentration to 40 wt% or below in the solution polymerization process of the present invention. At an excessively high monomer concentration, the process is essentially only a bulk polymerization and incapable of producing the prepolymer having the above-mentioned structures. The known process using a poor solvent is not effected at such a low monomer concentration. On the other hand, at an excessively low monomer concentration, a large quantity of polymerization initiator is needed, making the process uneconomical. The preferable monomer concentration is, therefore, in the range of from 5 to 40 wt%, more preferably from 10 to 35 wt%.

The monomer concentration defined in this specification is (DAT)/(DAT and solvent), all by weight.

In the process of the present invention, the monomer, solvent, and polymerization initiator may be charged simultaneously or at different times, e.g., first the solvent and, if necessary, the monomer, and then the monomer and polymerization initiator, may be charged. These feedstocks are charged in the reaction system of the present invention in a relatively flexible manner, but the monomer concentration is preferably kept within the above-mentioned range.

The general conditions of the other process conditions are described below, but it should be noted that the preferable conditions depend greatly on the operational mode chosen.

A common polymerization initiator, such as radical-forming organic peroxides and azo compounds, may be used for the present invention. The process efficiency may be notably affected by the polymerization initiator used, and preferably an initiator having a high efficiency, such as a compound having a dialkyl peroxide, perester or alkyl hydroperoxide structure, is selected. Specifically, the preferable polymerization initiators for the present invention include di-t-butyl peroxide, t-butyl peroxybenzoate, t-butyl hydroperoxide, dicumyl peroxide, and cumene hydroperoxide.

The optimum concentration of the polymerization initiator varies, depending on the type of initiator used. An excessively high concentration tends to cause the reactions to proceed at an uncontrollably high speed. It is difficult to define the optimum concentration range in a general manner, since it varies with the selected operational mode. For example, the optimum initiator concentration will be in the range of from 0.3 to 2.0 wt%, when di-t-butylperoxide is used.

The reaction temperature may be selected from a fairly wide range for the polymerization process itself, but is preferably in the range of from 120 to 200° C., more preferably from 140 to 170° C. At a lower temperature, the prepolymer produced is not satisfactorily dissolved in the alcohol solvent and does not fully realize the above-mentioned structures and properties. A higher temperature is undesirable, from the viewpoint of the efficiency of the initiator, controllability of the polymerization process, and the reaction pressure developed.

Conversion is another important consideration, and is defined in this specification as the ratio of the monomer eliminated by polymerization to that fed to the system. It is essential to control the conversion within a certain range to produce the DAT-P having the above-mentioned structures and properties, since other-wise the properties of the cured product from DAT-P may well show little improvement or, in the worst case, may be worsened.

A factor affecting conversion is gellation, and when it occurs as polymerization proceeds, the viscosity of the system is excessively increased, making the polymer agar-like, which can no longer be dissolved in a good solvent such as chloroform. It is necessary to suspend the polymerization process before gellation starts. A prepolymer may result, the cured product of which may have undesirable properties, even when the polymerization process is suspended immediately before gellation starts, and therefore, it is preferable to suspend the process at least 2% before, more preferably 5% before, the gellation conversion.

On the other hand, suspension of the polymerization process at an excessively early stage will also make it difficult to produce a prepolymer providing the desired properties when cured, and it is necessary to ensure some conversion, preferably at least 25%, more preferably 40% or above As discussed above, the conversion should be within a certain range, and although it is difficult to define the optimum conversion range in a general manner, because the gellation conversion varies depending on polymerization conditions, the preferable conversion level is in the range of from 25 to 90%, more preferably from 40 to 90%, most preferably from 60 to 90%. Should gellation occur before the optimum conversion level is attained, the polymerization process should be suspended at least 2%, preferably 5%, before gellation starts.

The reaction time may be arbitrarily chosen by controlling the polymerization initiator concentration, monomer concentration, and reaction temperature. An excessively short time or long time are undesirable from the viewpoint of gellation and productivity, respectively. Accordingly, the reaction time should be within a range of from 1 to 3 hours.

The polymerization process must be carefully controlled because, as described earlier, the optimum polymerization conversion varies as the reaction conditions vary. The best control method is difficult to generalize, and it is recommended to carry out synthesis experiments for isolation, under the optimum conditions determined by small-scale laboratory tests.

When alcohol is used as the solvent, DAT-P is precipitated after polymerization is over, and may be isolated, after removing the alcohol layer by decantation, by dissolving in an adequate solvent and dropping the solution into a poor solvent. It will then be separated out as a powder. The preferable solvents for dissolving DAT-P are aliphatic ketone and halogenated hydrocarbon, such as acetone, methylethylketone, chloroform, and methylene chloride.

When cyclic ether is used as the solvent, after completion of the polymerization, DAT-P may be isolated by dropping the polymerization solution into a poor solvent and washing the solution with the poor solvent. It will then be separated out as a powder.

The poor solvent for reprecipitation is preferably selected from aliphatic alcohol and aliphatic hydrocarbon, such as methanol, ethanol, isopropanol, t-butyl alcohol, n-butyl alcohol, sec-butyl alcohol, isobutyl alcohol, n-hexane, n-octane, and n-pentane.

Other isolation methods may be used for the present invention to separate DAT-P from the monomer, and these include liquid-liquid extraction, membrane-aided separation, and thin-film evaporation.

The prepolymer thus prepared according to the first feature of the invention is characterized by a high melt viscosity, as determined by a Koka flow tester, regardless of a low molecular weight determined by gel permeation chromatography (GPC).

The above is a characteristic useful for improving the properties of the prepolymer. In the polymerization with a rather poor solvent of alcohol, a chain transfer occurs before the growth chain length per radical is increased, i.e., before the number of carbon atoms in the main chain is increased, and the molecular weight thereafter is increased as a result of the addition of the growth radicals to allyl groups pendant from the main chains. The prepolymer thus prepared has a lower iodine value than the bulk-polymerized prepolymer having an iodine value of around 90.

The prepolymer is dissolved in the solvent to a limited extent, with the result that the prepolymer molecules are incapable of spreading freely and gather in relatively compact bodies. These do not interact with each other extensively, but chains in the same molecule interact with each other extensively, and as a result, intramolecular cross-linking occurs more frequently than in a solution of a good solvent, which further decreases the iodine number of the prepolymer. On the other hand, in the absence of the solvent, the polymer molecule has a characteristic structure of a short main chain, a great number of branches, and a number of chain-chain bonds, with the result that the molecules extensively interact with each other. This increases the melt viscosity, regardless of the low GPC-determined molecular weight.

The characteristic prepolymer structure of a high cross-linking density is considered to impart improved properties to the used product.

When the number of monomer units in the carboncarbon bonded molecular chain portion, which is composed of the allyl group for the monomer units, is 15 or more, gellation may occur before the polymer is sufficiently cross-linked to provide improved properties thereof. Therefore, the number of monomer units in the carboncarbon bonded molecular chain portion must be kept at 10 or less, preferably 8 or less. This compares with the number of around 30 of the bulk-polymerized prepolymer.

The iodine value is another important consideration because the properties are improved by increasing the cross-linking density, and should be controlled to a level lower than that of the bulk-polymerized prepolymer. It should be noted, however, that it is difficult to cure a prepolymer having an excessively low iodine number, and accordingly, the iodine value of the prepolymer is preferably in a range of from 40 to 70, more preferably from 50 to 65.

The prepolymer of the above structure has a lower GPC-determined weight-average molecular weight than the conventional prepolymer, regardless of the high melt viscosity thereof. The melt viscosity of the prepolymer having the improved properties should be at least 30000 CP at 170° C., preferably 500000 CP or higher, when determined by a Koka type flow tester, but is preferably 90000 CP or lower, because an excessively high viscosity is undesirable from the viewpoint of the forming process.

The GPC-determined number-average molecular weight (Mn) is preferably in the range of from 6000 to 25000, more preferably from 6000 to 15000. A prepolymer having an excessively low molecular weight may not have the desired properties, and a prepolymer having an excessively high molecular weight is easily gelled, because of the excessively accelerated cross-linking reactions.

The Mw value is preferably in the range of from 10000 to 70000, more preferably from 15000 to 40000. As is well known, the GPC elution time is in proportion to the effective volume J. This may account for a larger Mw-Mn difference of the prepolymer of the present invention than that of the conventional prepolymer, because of the lowered J value of the high-molecular-weight prepolymer. The prepolymer having a Mw value above 70000 will rarely benefit from the above favorable effect, and will show little improvement of the properties thereof.

The number-average molecular weight (Mn) of the prepolymer, determined by vapor pressure osmosis (VPO), is in the range of from 8000 to 25000. The VPO-determined Mn is preferably 1.4 to 2.8 times higher than the GPC-determined Mn.

The prepolymer also tends to have a low intrinsic viscosity ($\eta$) value, because of a lowered inertia square radius thereof. The intrinsic viscosity is preferably in the range of from 0.06 to 0.12, more preferably 0.01 or lower, in chloroform at 20° C, provided that the prepolymer has a molecular weight in the above-mentioned range. The properties are little improved when the intrinsic viscosity of the prepolymer is more than 0.12.

As discussed above, the solubility of the prepolymer in a solvent is an important factor, and a prepolymer having an excessively low solubility will be separated into two layers at an early stage of the polymerization, and thus will soon become solvent-insoluble because of an excessively accelerated polymerization of the prepolymer layer. On the other hand, a prepolymer having an excessively high solubility will show little improvement in the properties thereof because the polymer molecules spread too extensively in the solvent for the above-mentioned desired phenomenon to occur.

The SP value is not a sole measure for the conditions of such a phenomenon, since it is also affected by the chain transfer constant and molecular structure of the solvent used, and another aliphatic alcohol but having a functional group may be needed, depending on the circumstances.

The resulting prepolymer according to the second feature of the present invention is characterized by a low melt viscosity, as determined by a Koka type flow tester, regardless of a relatively high molecular weight determined by gel permeation chromatography and by the presence of many polymer chains containing a small number of the monomer repeating units.

The melt viscosity of the prepolymer may preferably be in a range of 20,000 to 80,000 CP at 130° C, when 551 determined by a Koka type flow tester. Where the viscosity is lower than the lower limit, the prepolymer has a low molecular weight and thus does not provide the desired properties. On the other hand, even where the viscosity is higher than the upper limit, a further improvement of the properties cannot be expected.

The above-mentioned structures of the prepolymers are determined by the following methods. Each prepolymer sample was washed with methanol before testing, to almost completely remove the monomer.

A) Determination of Iodine Value

In a 200 ml flask was placed an accurate measure of 0.2 to 0.35 g of the prepolymer and 30 ml of chloroform was added thereto to form a completely homogeneous solution. Precisely 20 ml of the Wijs reagent (7.9 g of iodine trichloride and 8.2 g of iodine were dissolved separately in each 200 to 300 ml of glacial acetic acid, and the solutions were mixed together and adjusted to a volume of 1 l) was added to the above solution by means of a whole pipette, to which 10 ml of 2.5% glacial acetic acid solution of mercuric acetate was added, and the solution was allowed to stand in a dark place to complete the reactions. Then 5 ml of 20% fresh KI solution was added to the above solution, to determine the iodine value by titration, with 0.1N $Na_2S_2O_3$ as the standard solution and 1% starch solution as the indicator. A blank test was also performed.

Iodine value $=(A+B)\times f\times 1.27/s$
where,

A: A quantity of 0.1N $Na_2S_2O_3$ solution needed for the blank test (ml)

B: quantity of 0.1N $Na_2S_2O_3$ solution needed for the test (ml)

f: titer of 0.1N $Na_2S_2O_3$ solution s: quantity of the sample (g)

B) Determination of Mn and Mw by Gel Permeation Chromatography

Mn and Mw as polystyrene were determined by gel permeation chromatography (GPG) with chloroform as the solvent, where SHODEX columns AC-80P, 802, 804 and 806 were connected in series in this order. The test conditions were a test temperature of 25° C. and a flow rate of 1.0 ml/min.

① At least 10 different types of commercial polystyrene having a known average molecular weight were passed together with DAT monomer through the column unit, to determine the retention time of each sample. The calibration curve was drawn to show the relationship between the average molecular weight and the retention time, which was represented by a third-order or broken line graph.

② 20 mg of the sample was dissolved in 20 ml of and 0.5 ml of the solution was injected into the column unit via a line filter. The elution curve data obtained by the above procedure was automatically processed, referring to the calibration chart drawn in the ① section, by a data processor (such as a Model CR-3A, supplied by Shimadzu Corp.), to determine the Mn and Mw values. Each peak was divided into sections at intervals of 10 sec and the Mn and Mw values were determined by the following equations, where $M_i$ and $H_i$ stand for the molecular weight and peak height of each section.

$Mn = \Sigma H_i/\Sigma(H_i/M_i)$, and $Mw = \Sigma M_i H_i/\Sigma H_i$

C) Determination of Number-Average Molecular Weight (Mn) by Vapor Pressure Osmosis (VPO)

| analyzer: | molecular weight analyzer, model 115, supplied by Corona |
|---|---|
| Solvent: | benzene |
| temperature: | 40° C. |

Four to five dilute solution samples ($1\times 10^{-1}$ to $5\times 10^{-1}$ wt%) were prepared, with which R was determined by an analyzer for each solution, and then used to determine the apparent molecular weight, by referring to the calibration chart, which was drawn with benzyl as the standard material. The apparent molecular weight was plotted against concentration, and the data were extrapolated to C=0, to determine the Mn.

D) Determination of Intrinsic Viscosity

The intrinsic viscosity was determined, using an Ubbelohde viscometer (viscometer No. 0, supplied by Shibata Glass) and chloroform as the solvent, where the sample concentration was varied at 20° C kept by a constant temperature water bath. The reduced viscosity ($\eta SP/C$) data were extrapolated to C =0, to determine the intrinsic viscosity $[\eta]$.

$$[\eta] = \lim_{C\to 0} \eta_{SP/C}$$

E) Hydrolysis of Prepolymer
Production of Polyallyl Alcohol

Ten weight parts of the prepolymer and 10 weight parts of KOH were placed in 100 ml of ethanol and 100 ml of THF, and after the vessel was purged with nitrogen, the solution was reflux-treated for 8 h. The precipitate formed was filtered, the filtrate neutralized with 2N HCl, and the precipitate formed also filtered. The filtrate was then evaporated to remove the solvent. The salt was precipitated during the evaporation process. The hydrolysis product was dissolved in isopropanol, which was filtered to remove the undissolved salt, and the solvent was removed by evaporation. This procedure was repeated until no salt was precipitated.

F) Production of Acetate from Hydrolysis Product
Production of Polyallyl Acetate A mixture of polyallyl alcohol produced in section E), 20 weight parts of acetic anhydride, and 0.1 weight parts of pyridine was reflux-treated under heat for 10 h, to remove the compounds distillable by the evaporation, and then heated at 120° C under a vacuum to completely remove acetic anhydride.

G) Determination of Number of Monomer Units in Carbon-Carbon Bonded Molecular Chain Portion Derived From Allyl Group for Monomer Units The number-average molecular weight $Mn_{PAAC}$ of the pollyallyl alcohol prepared in section F) was determined the by VPO, and this value was used to determine the number of monomer units (Pn) in the carbon-carbon bonded molecular chain portion, by the following equation:

$Pn = Mn_{PAAC}/100$

H) Determination of Apparent Viscosity by Koka type Flow Tester

| analyzer: | flow tester model CFT-500, supplied by Shimadzu |
|---|---|
| nozzle dimensions: | 1 mm in diameter, 10 mm long |
| load: | 100 kg-f |
| temperature: | 130 or 170° C. |
| preheating time: | 300 sec |
| sample quantity: | 1.5 g |

The apparent viscosity $\eta'$ of the molten prepolymer was determined by the following equation:

$\eta' = TW'/DW' = \pi PR^4/8LQ$ (Poise)

where, $\eta'$: apparent viscosity of the molten prepolymer
TW,: apparent grinding stress on the wall (dyne/cm²)
DW': apparent grinding velocity (1/sec)
Q: flow rate (ml)
P: extrusion pressure (dyne/cm²)
R: nozzle radius (cm)
L: nozzle length (cm)

When the measured viscosity was very low (refer to Tables 2 and 3), the test temperature was lowered to 130° C.

I) Measurement of $^{13}C$ NMR and $1_H$ NMR analyzer

| | |
|---|---|
| $^{13}$C NMR: | Model CXP-300, supplied by Bruker |
| $^1$H NMR: | Model R-24B, supplied by Hitachi |

The solvents used in the analysis were deuterated chloroform for the DAT prepolymer and polyallyl acetate, and deuterated DSMO for the polyallyl alcohol. Tetramethyl silane was used as the internal standard material. It was clearly confirmed by analyzing the above spectra that the prepolymer of the present invention consists essentially of diallyl terephthalate monomer units.

An additive can be added to the new DAT prepolymer of the present invention, as needed, to the extent that the desired properties are not damaged, to improve some of the properties of the prepolymer itself, such as formability, or of the articles formed therefrom. The additives that may be used for the prepolymer include: filler, polymerization promoter, polymerization inhibitor, internal release agent, silane coupling agent, and pigment.

The present invention will be more fully illustrated by the following examples:

EXAMPLE 1

1.5 kg of DAT, 4.5 kg of 2-butanol, and 13.5 g of di-t-butylperoxide (hereinafter referred to as "DTBPO") were charged in a 10 l autoclave, and after the reaction system was purged with nitrogen, were allowed to react at 160° C for 2 h. On completion of the reactions, the system was cooled to room temperature, to precipitate the prepolymer.

The upper, monomer-containing 2-butanol layer was removed from the system to some extent by decantation. The precipitate was stirred vigorously, and crushed at times, in 5.0 l of methanol for 1 h. This system was filtered to remove methanol, the precipitate was placed in 5.0 l of methanol, and the above procedure was repeated. After the methanol was removed, the precipitate was dried and crushed to produce the prepolymer.

Figure 1:
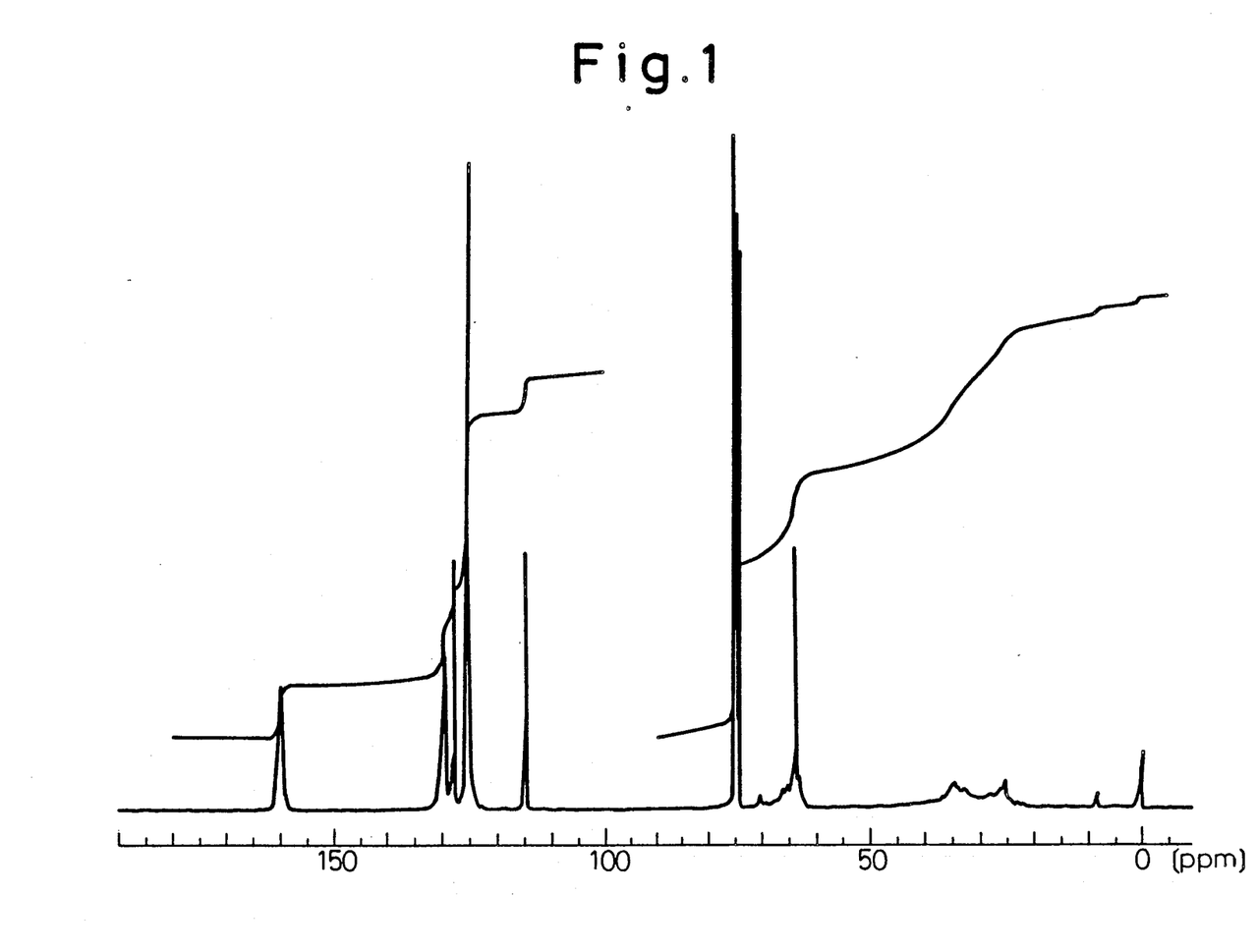
FIG. 1 is a $13_C$ NMR spectrum of a prepolymer obtained in Example 1.
Figure 2:
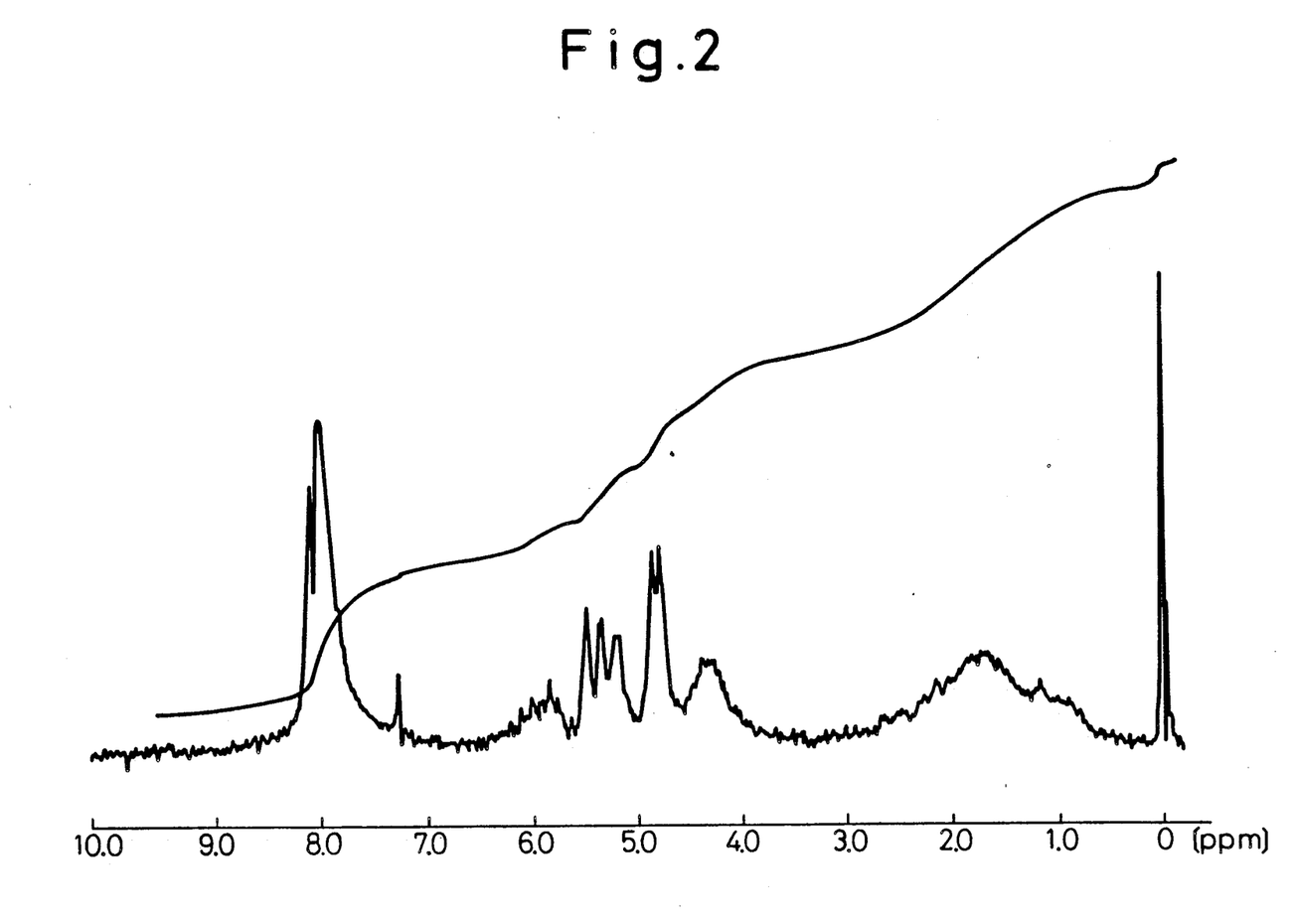
FIG. 2 is a $1_H$ NMR spectrum of the prepolymer.
Figure 3:
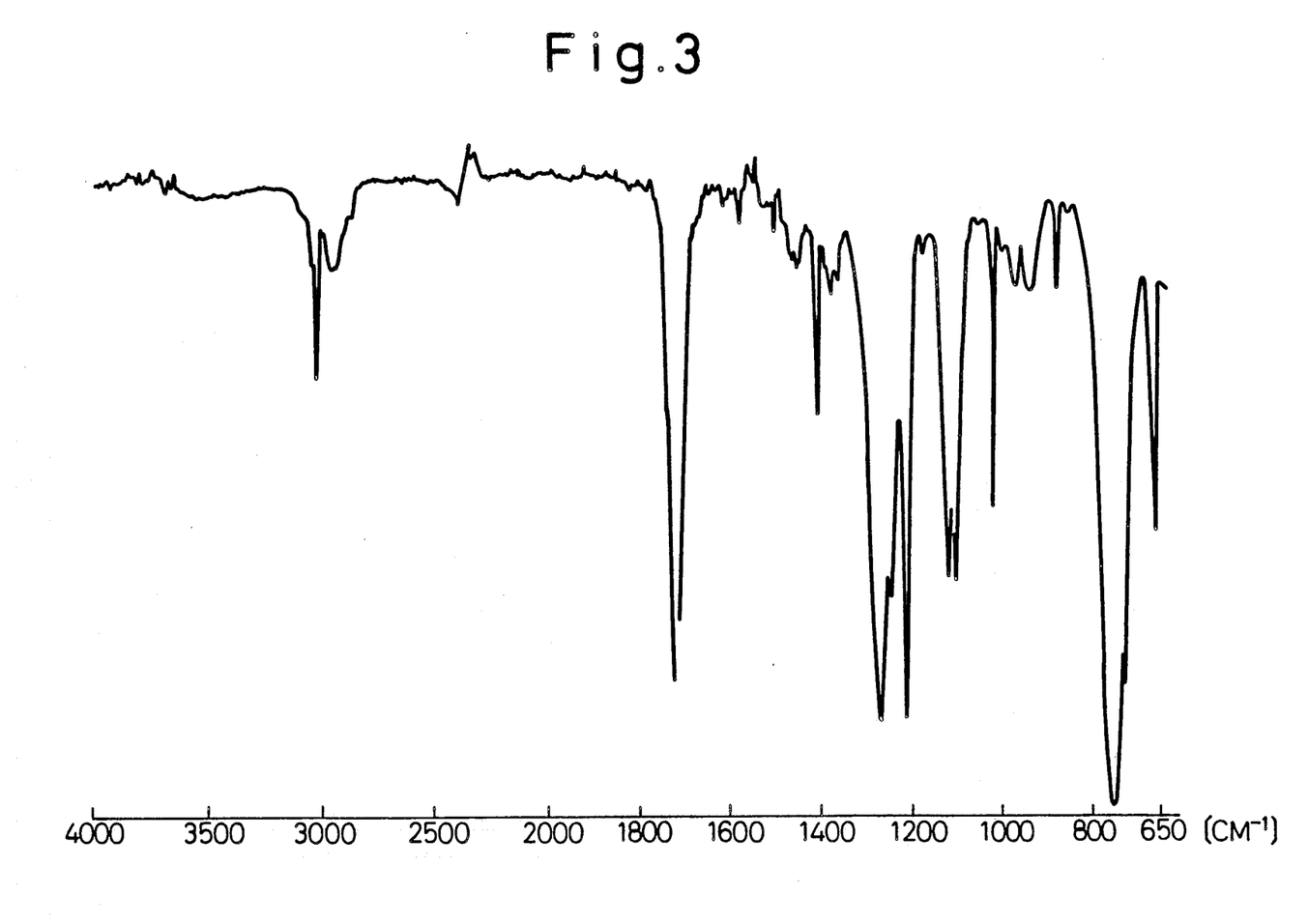
FIG. 3 is an IR spectrum of the prepolymer.
Figure 4:
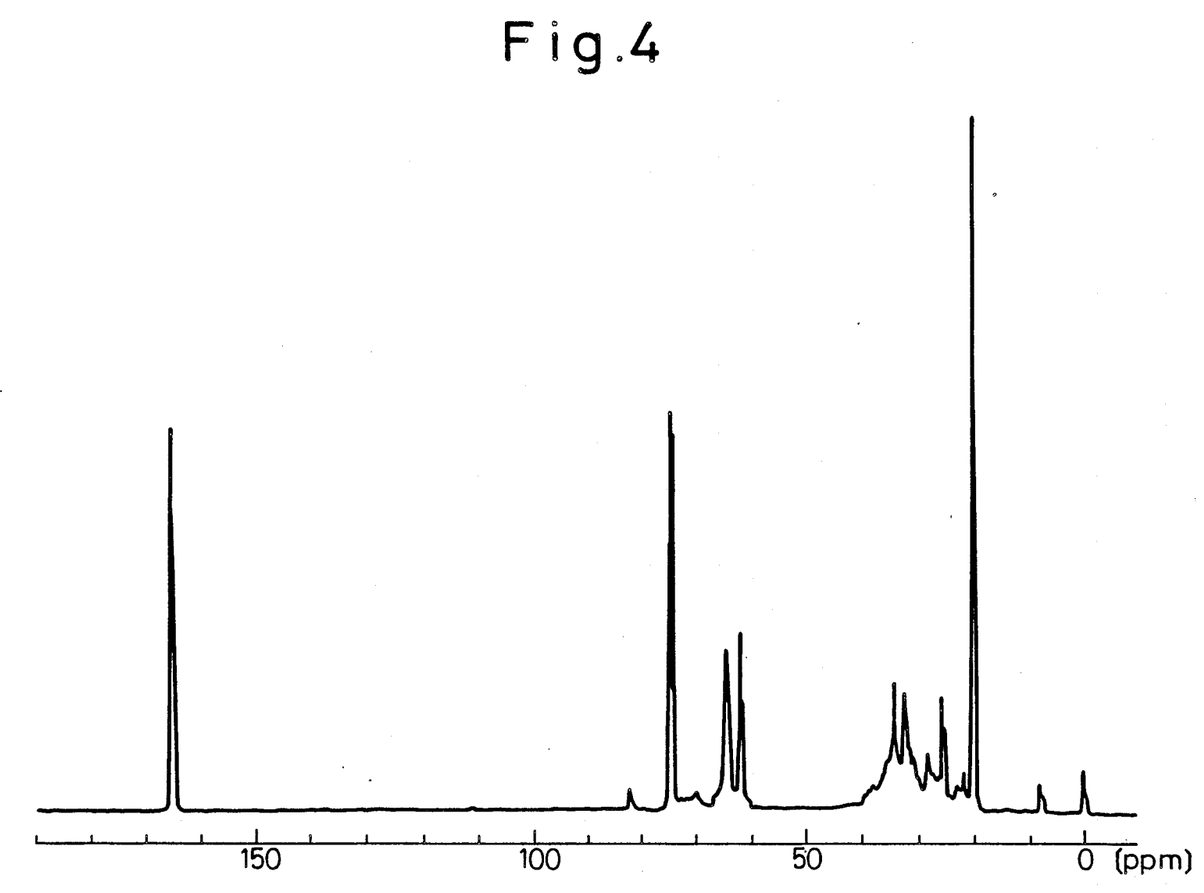
FIG. 4 is a $13_C$ NMR spectrum of the polyallyl acetate obtained by acetylation of the propolymer through hydrolysis.
Figure 5:
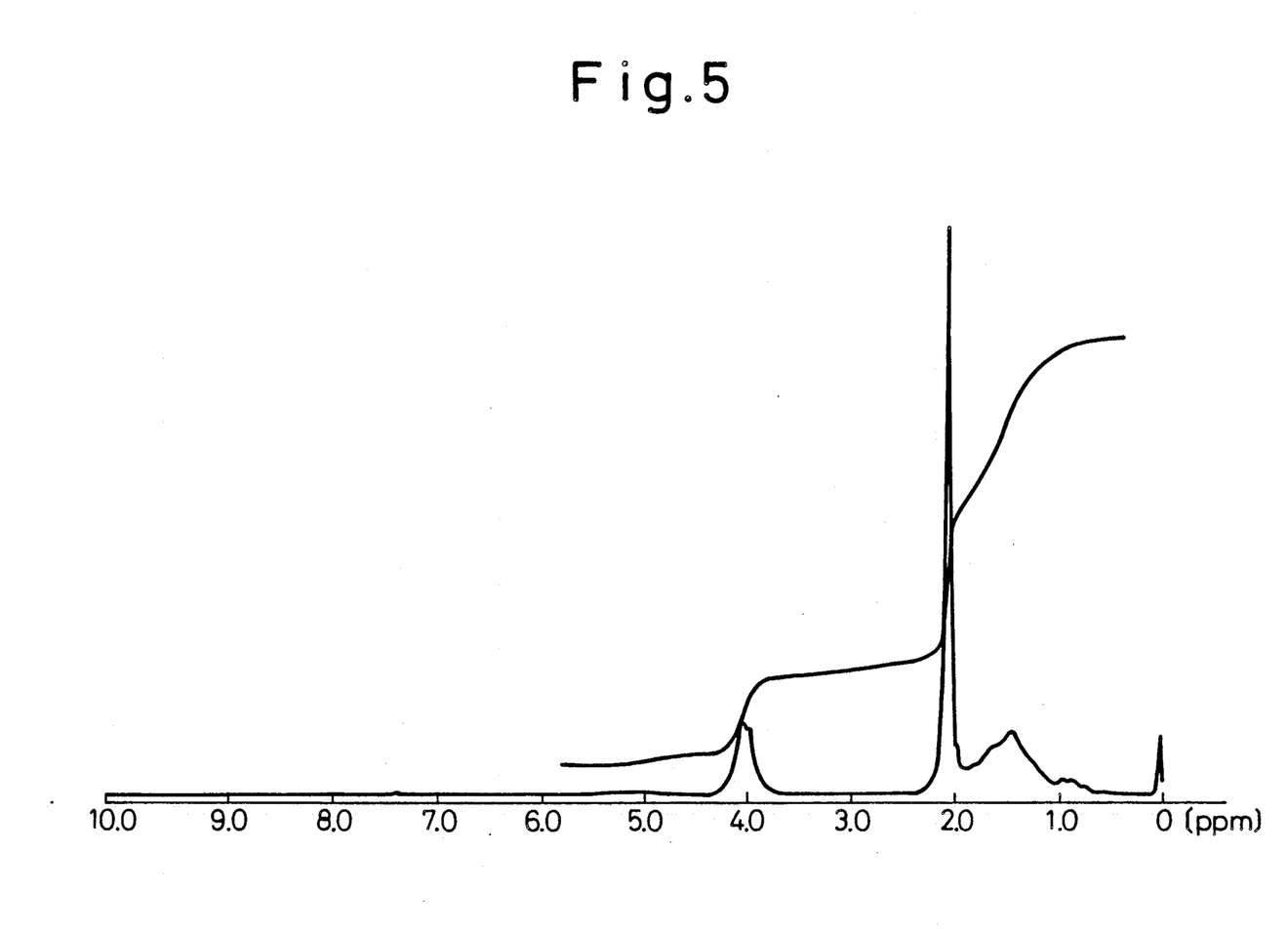
FIG. 5 is a $1_H$ NMR spectrum of the polyallyl acetate.

FIGS. 1, 2, and 3 show the $^{13}$C NMR, $1_H$ NMR and IR analysis results of the prepolymer, and FIGS. 4 and 5 show the $^{13}$C NMR and 1H NMR analysis results of the prepolymer acetylated into polyallyl acetate.

In the $^{13}$C NMR spectra shown in FIG. 1, the peak at around 160 ppm is relevant to the carbonyl group in the ester, the relatively sharp peaks at around 115 and 128 ppm to the double bonds in the pendant allyl group, the peaks at around 125 and 130 ppm to the benzene ring, the sharp and broad peaks at 60 to 70 ppm to methylene bonded to ester oxygen, and the broad peaks at 20 to 40 ppm to methylene and methine in the polymer's main chain.

In the $1_H$ NMR spectra shown in FIG. 2, the peak at around 8.0 ppm is relevant to H in the benzene ring, those at 5 to 6.5 ppm to H in the double bonds of the pendant allyl group, that at around 4.9 ppm to H in methylene in the pendant allyl group, the broad peak at around 4.4 ppm to methylene to which oxygen in the polymerized allyl group is bonded, and the broad peaks at 1 to 3 ppm to methylene and methine in the polymer's main chain.

In the IR spectra shown in FIG. 3, the absorption at 1720 cm$^{-1}$ is relevant to the expansion/contraction of carbonyl group in ester.

In the $^{13}$C NMR spectra of polyallyl acetate, shown in FIG. 4, the peak at around 165 ppm is relevant to carbonyl group in the ester, those at around 60 to 70 ppm to the oxygen-bonded methylene group, those at around 20 to 40 ppm to the polymer's main chain, and the sharp peak at around 20 ppm to methyl in the acetate group.

In the $^1$H NMR spectra of polyallyl acetate shown in FIG. 5, the sharp peak at 2.05 ppm is relevant to H in the acetyl group, the peak at around 4.0 ppm to the oxygen-bonded methylene, and the broad peaks at 0.9 to 2.0 to the polymer's main chain.

EXAMPLES 2 TO 4

The same procedure for EXAMPLE 1 was repeated using the same apparatus, except for the polymerization conditions shown in Table 1, to prepare the prepolymer samples.

Table 1 shows the polymerization conditions and the properties of the prepolymer samples prepared under different conditions in EXAMPLES 1 through 4.

TABLE 1

| Polymerization Conditions | EXAMPLE 1 | EXAMPLE 2 | EXAMPLE 3 | EXAMPLE 4 |
|---|---|---|---|---|
| DAT | 1.5 kg | 1.5 kg | 1.5 kg | 1.5 kg |
| Solvent | 2-butanol 4.5 kg | n-butanol 4.5 kg | 2-butanol 6.0 kg | n-butanol 6.0 kg |
| Initiator | DTBPO 13.5 g | DTBPO 44.1 g | DTBPO 18.6 g | DTBPO 79.0 g |
| Polymerization Temperature | 160° C. | 140° C. | 140° C. | 140° C. |
| Reaction Pressure (gauge) | 4.8K | 1.5K | 2.6K | 1.8K |
| Polymerization Time | 2.0 h | 2.0 h | 2.0 h | 2.0 h |
| Conversion | 56% | 49% | 71% | 57% |
| Isolated Yield | 42% | 36% | 58% | 46% |
| No. of Monomer Units | 9.03 | 8.01 | 7.59 | 6.21 |
| Iodine Value | 66 | 67 | 59 | 57 |
| GPC-Determined Mn | $9.91 \times 10^3$ | $9.90 \times 10^3$ | $7.80 \times 10^3$ | $8.33 \times 10^3$ |
| GPC-Determined Mw | $3.66 \times 10^4$ | $3.66 \times 10^4$ | $1.74 \times 10^4$ | $1.90 \times 10^4$ |
| VPO-Determined Mn | $1.75 \times 10^4$ | $1.82 \times 10^4$ | $1.60 \times 10^4$ | $1.73 \times 10^4$ |
| Intrinsic Viscosity[1] | 0.082 | 0.083 | 0.077 | 0.080 |
| Melt Viscosity[2] (CP) | 73000 | 75000 | 68000 | 69000 |

[1] in chloroform at 20° C.
[2] at 170° C., determined by means of a Koka type flow tester

EXAMPLE 5

1.5 kg of DAT, 4.0 kg of dioxiane, and 16.1 g of di-t-butylperoxide (hereinafater referred to as "DTBPO") were charged in a 10 l autoclave, and after the reaction system was purged with nitrogen, were allowed to react at 160° C for 2 h. On completion of the reactions, the system was cooled to room temperature.

The polymerization mixture was dropped into 20.0 l of methanol, and the residual monomer, dioxane, and methanol was removed by decantation. The precipitate was stirred vigorously, and crushed at times, in 5.0 l of methanol for 1 h. This system was filtered to remove methanol, the precipitate was placed in 5.0 l of methanol, and the above procedure was repeated. After the methanol was removed, the precipitate was dried and crushed to produce the prepolymer.

Figure 6:
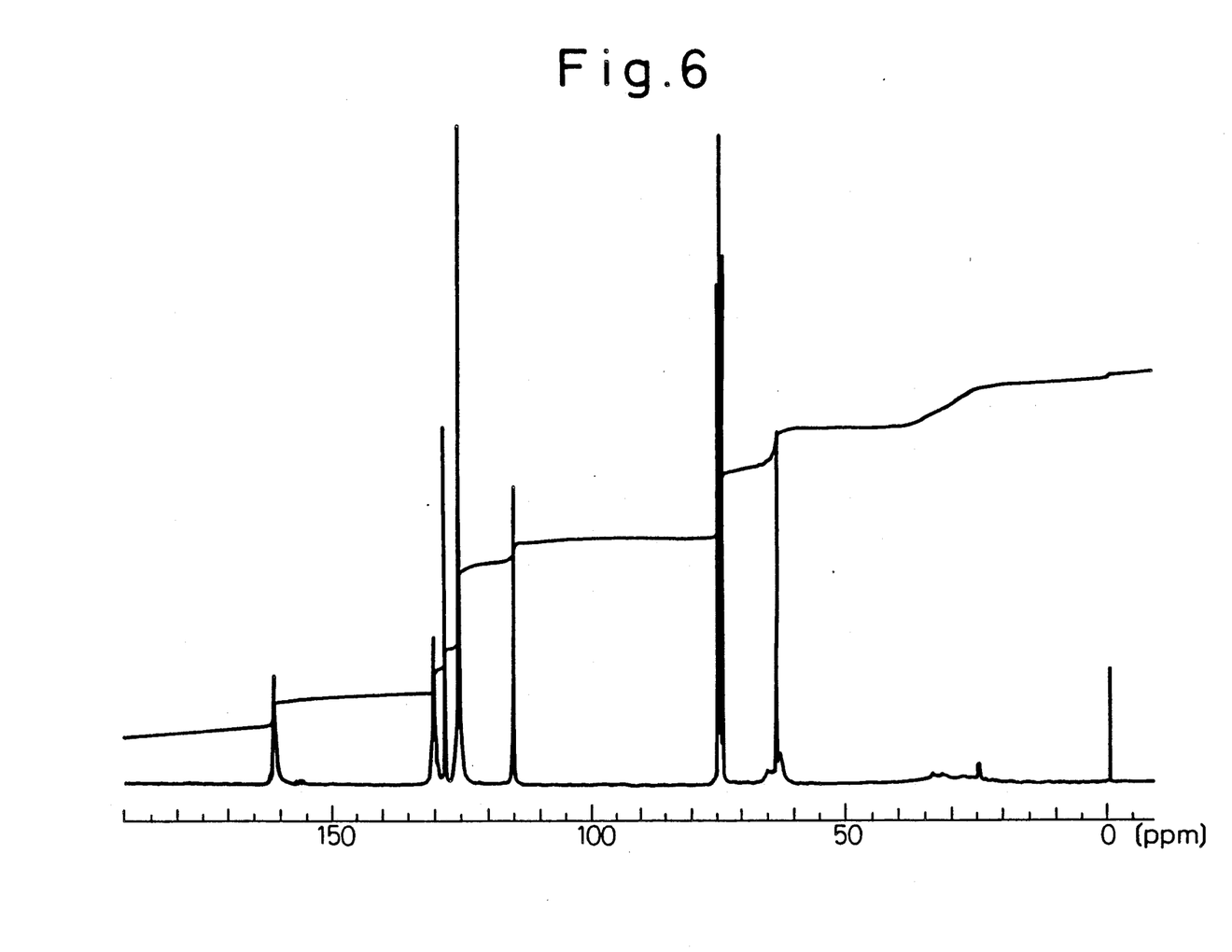
FIG. 6 is a 13C NMR spectrum of a prepolymer obtained in Example 5.
Figure 7:
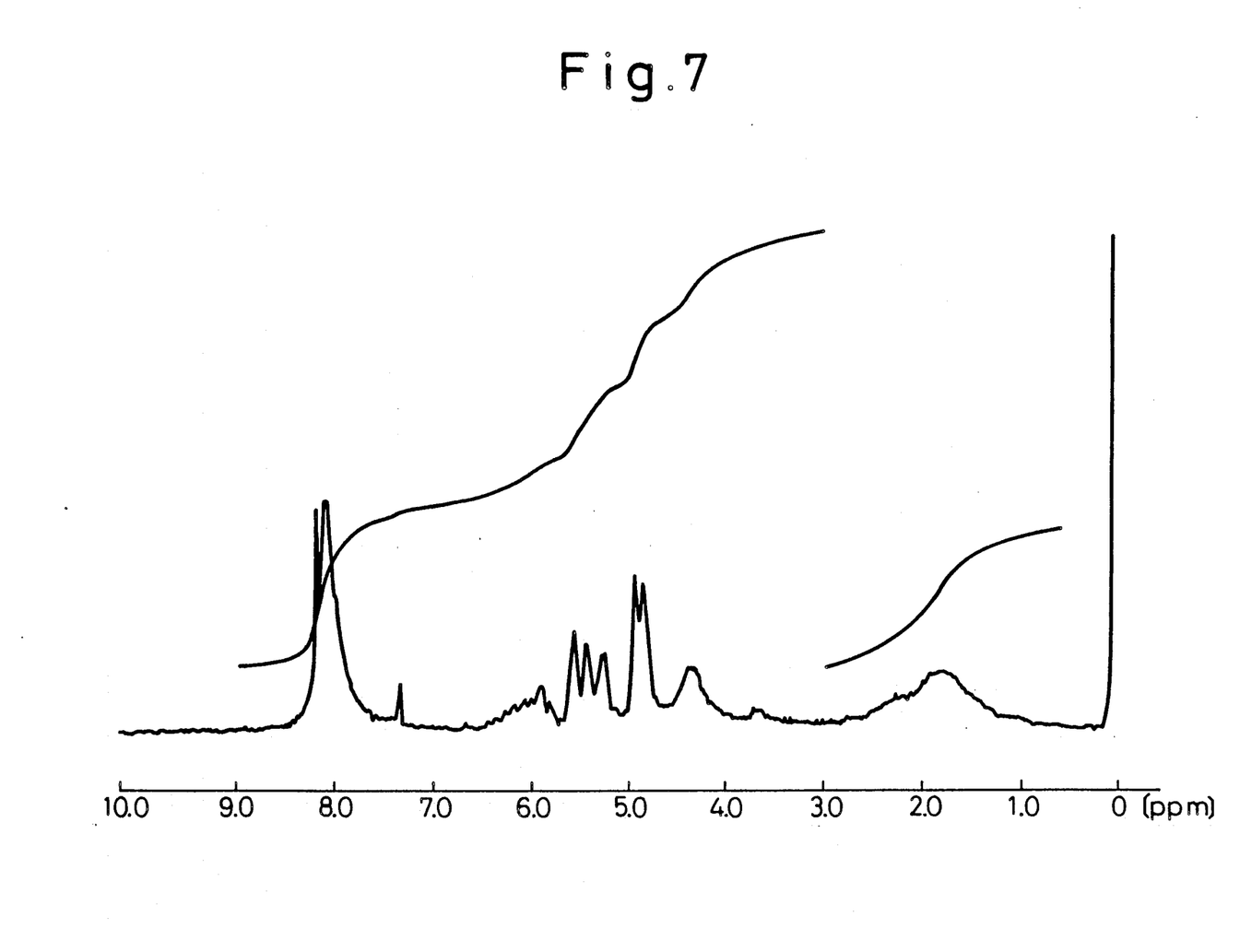
FIG. 7 is a $1_H$ NMR spectrum of the prepolymer.
Figure 8:
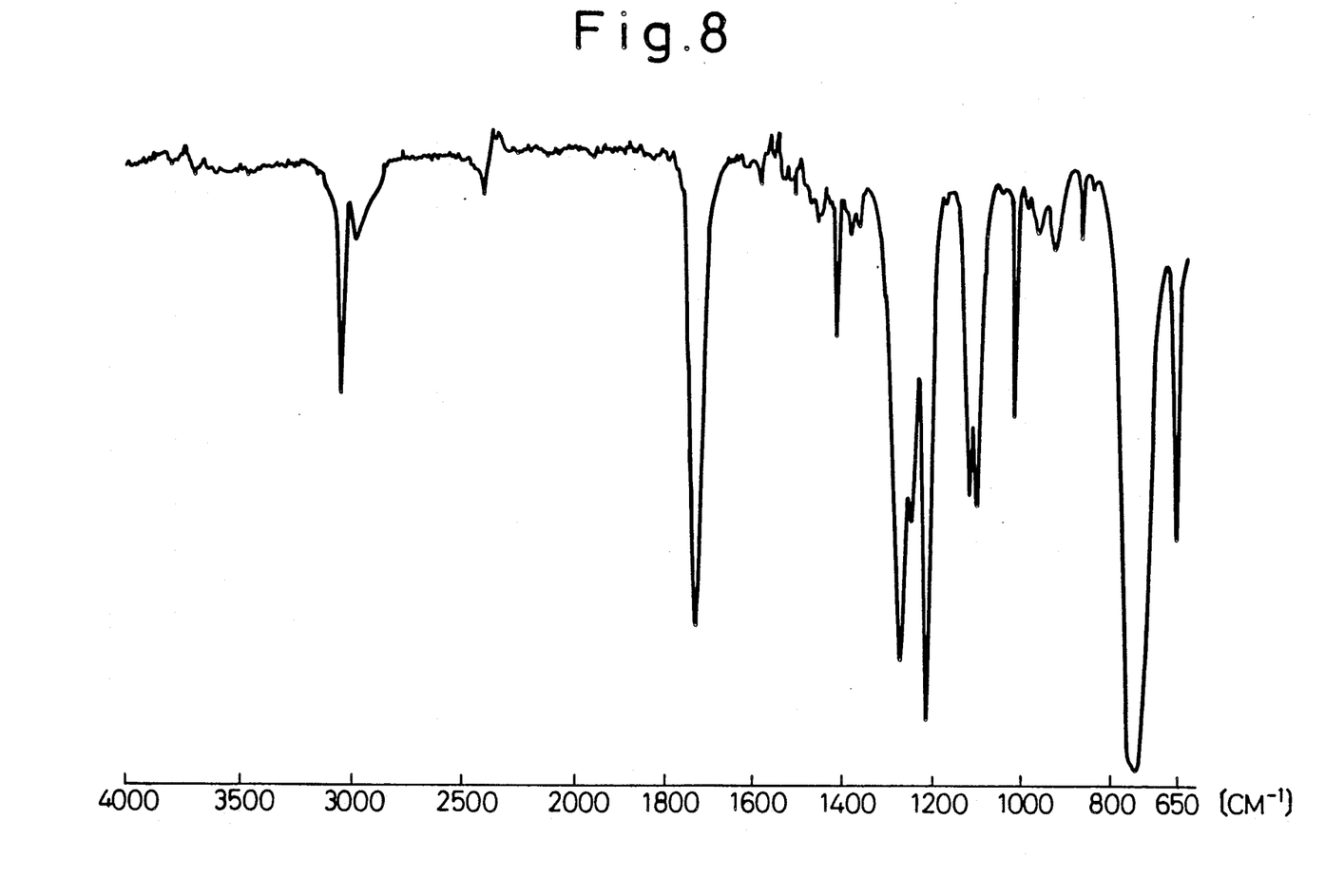
FIG. 8 is an IR spectrum of the prepolymer.
Figure 9:
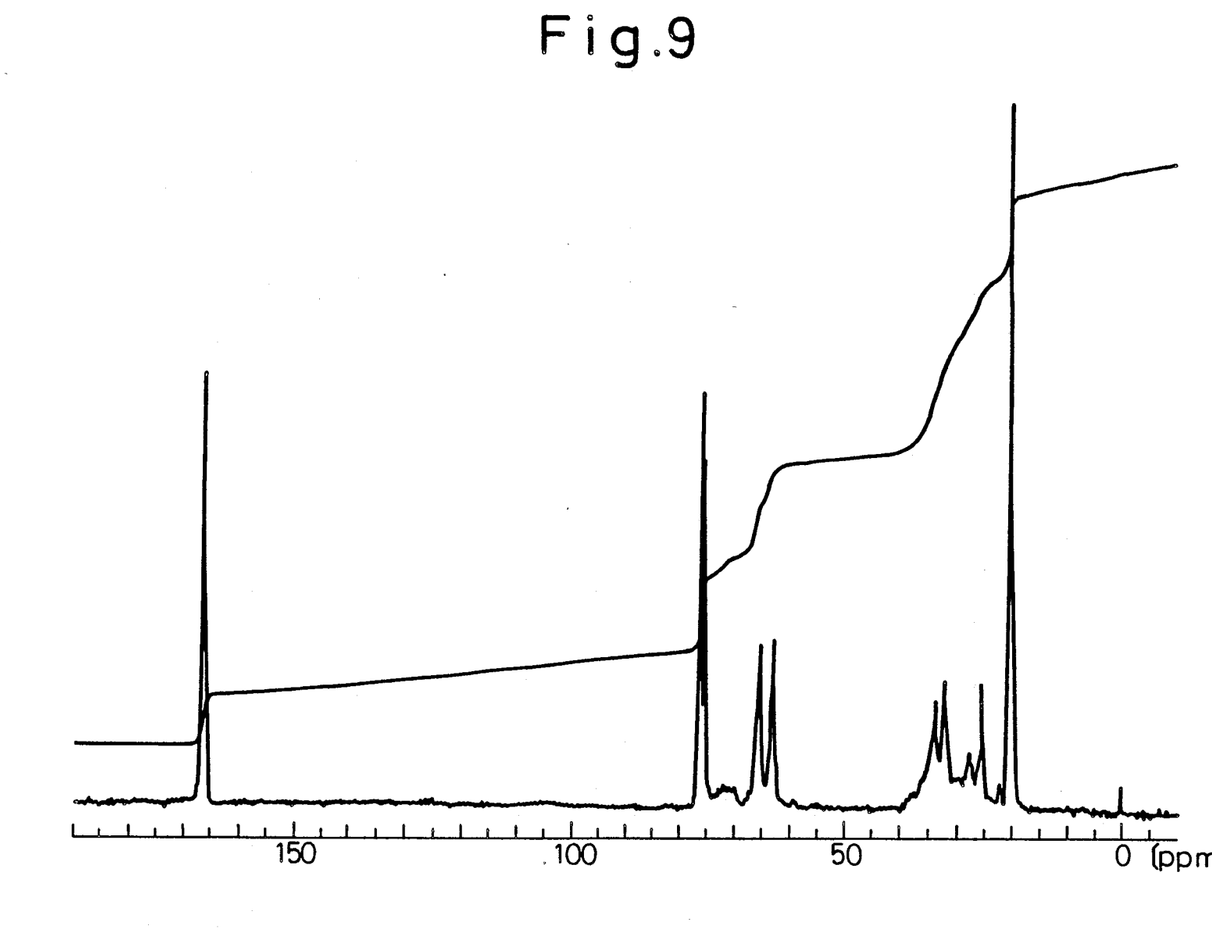
FIG. 9 is a $13_C$ NMR spectrum of the polyallyl acetate obtained by acetylation of the prepolymer through hydrolysis.

FIGS. 6, 7, and 8 show the $^{13}$C NMR, $^1$H NMR and IR analysis results of the prepolymer, and FIG. 9 shows the $^{13}$C NMR analysis results of the prepolymer acetylated into polyallyl acetate.

In the $^{13}$C NMR spectra shown in FIG. 6, the peak at around 160 ppm is relevant to the carbonyl group in the ester, the relatively sharp peaks at around 115 and 128 ppm to the double bonds in the pendant allyl group, the peaks at around 125 and 130 ppm to the benzene ring, the sharp and broad peaks at 60 to 70 ppm to methylene bonded to ester oxygen, and the broad peaks at 20 to 40 ppm to methylene and methine in the polymer's main chain.

In the $^1$H NMR spectra shown in FIG. 7, the peak at around 8.0 ppm is relevant to H in the benzene ring, those at 5 to 6.5 ppm to H in the double bonds of the pendant allyl group, that at around 4.9 ppm to H in methylene in the pendant allyl group, the broad peak at around 4.4 ppm to methylene to which oxygen in the polymerized allyl group is bonded, and the broad peaks at 1 to 3 ppm to methylene and methine in the polymer's main chain.

In the IR spectra shown in FIG. 8, the absorption at 1720 cm$^{-1}$ is relevant to the expansion/contraction of the carbonyl group in ester.

In the $^{13}$C NMR spectra of polyallyl acetate, shown in FIG. 9, the peak at around 165 ppm is relevant to the carbonyl group in the ester, those at around 60 to 70 ppm to the oxygen-bonded methylene group, and those at around 20 to 40 ppm to the polymer's main chain.

EXAMPLES 6 to 8

The same procedure for EXAMPLE 5 was repeated using the same apparatus, except for the polymerization conditions shown in Table 2, to prepare the prepolymer samples.

Table 2 shows the polymerization conditions and the properties of the prepolymer samples prepared under different conditions in EXAMPLES 5 through 8.

TABLE 2

| Polymerization Conditions | EXAMPLE 5 | EXAMPLE 6 | EXAMPLE 7 | EXAMPLE 8 |
|---|---|---|---|---|
| DAT | 2.0 kg | 1.5 kg | 2.0 kg | 1.5 kg |
| Solvent | dioxane 4.0 kg | dioxane 4.5 kg | THF[3] 4.0 kg | THF 4.0 kg |
| Initiator | DTBPO 16.1 g | DTBPO 18.1 g | DTBPO 18.6 g | DTBPO 29.0 g |
| Polymerization Temperature | 140° C. | 140° C. | 140° C. | 140° C. |
| Reaction Pressure (gauge) | 1.8K | 2.2K | 5.8K | 7.0K |
| Polymerization Time | 2.0 h | 2.0 h | 2.0 h | 2.0 h |
| Conversion | 47% | 54% | 50% | 57% |
| Isolated Yield | 32% | 40% | 38% | 44% |
| No. of Monomer Units | 7.20 | 6.51 | 7.56 | 6.29 |
| Iodine Value | 70 | 72 | 69 | 67 |
| GPC-Determined Mn | $1.15 \times 10^4$ | $8.98 \times 10^3$ | $8.20 \times 10^3$ | $8.33 \times 10^3$ |
| GPC-Determined Mw | $6.69 \times 10^4$ | $6.22 \times 10^4$ | $5.88 \times 10^4$ | $5.90 \times 10^4$ |
| VPO-Determined Mn | $1.73 \times 10^4$ | $1.53 \times 10^4$ | $1.56 \times 10^4$ | $1.53 \times 10^4$ |
| Intrinsic Vixcosity[1] | 0.1120 | 0.1082 | 0.1107 | 0.1056 |
| Melt Viscosity[2] (CP) | 36000 | 35000 | 48000 | 51000 |

[1] in chloroform at 20° C.
[2] at 130° C., determined by means of a Koka flow tester
[3] tetrahydrofuran

COMPARATIVE EXAMPLES 1 to 4

DAT was synthesized under a variety of polymerization conditions for COMPARATIVE EXAMPLES, and the results are shown in Table 3. The prepolymer prepared by a solvent-free process was not specially isolated from the product system. The prepolymer prepared by a solvent-aided process was isolated by the procedure wherein the product system was added to 10 volume parts of methanol per 1 volume part of the monomer, after the solvent was distilled off, and the mixture was stirred for 1 hour. The monomer-dissolved methanol was removed by decantation, and the precipitate thus formed was placed in 5 volume parts of methanol per 1 volume part of the precipitate and the mixture was stirred vigorously for 1 h, while crushing the precipitate at times. Methanol was removed by filtration, and the precipitate was put in 5 volume parts of methanol per 1 volume part of the precipitate, and the above procedure was repeated. The precipitate was dried and crushed, after methanol was removed by filtration, to prepare the prepolymer sample.

TABLE 3

| | COMPARATIVE EXAMPLE 1 | COMPARATIVE EXAMPLE 2 | COMPARATIVE EXAMPLE 3 | COMPARATIVE EXAMPLE 4 |
|---|---|---|---|---|
| DAT | 5.0 kg | 2.0 kg | 2.0 kg | 1.0 kg |
| Solvent | none | benzene 4.0 kg | ethyl acetate | none |

TABLE 3-continued

|  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|
| Initiator | DTBPO | DTBPO | 4.0 kg. DTBPO | BPO[3] |
|  | 1.75 g | 18.9 g | 13.5 g | 20.0 g |
| Polymerization Temperature | 160° C. | 140° C. | 140° C. | 100° C. |
| Reaction Pressure (gauge) | 0K | 3.0K | 3.9K | 0K |
| Polymerization Time | 2.0 h | 2.0 h | 2.0 h | 2.0 h |
| Conversion | 19% | 33% | 31% | 18% |
| Isolated Yield | 16% | 27% | 26% | 14% |
| No. of Monomer Units | 17.6 | 21.7 | 19.1 | 27.8 |
| Iodine Value | 91 | 70 | 70 | 94 |
| GPC-Determined Mn | $1.15 \times 10^4$ | $1.02 \times 10^4$ | $9.38 \times 10^4$ | $8.36 \times 10^4$ |
| GPC-Determined Mw | $6.60 \times 10^4$ | $2.44 \times 10^4$ | $2.68 \times 10^4$ | $5.26 \times 10^4$ |
| VPO-Determined Mn | $2.09 \times 10^4$ | $1.57 \times 10^4$ | $1.15 \times 10^4$ | $1.63 \times 10^4$ |
| Intrinsic Vixcosity[1] | 0.104 | 0.084 | 0.074 | 0.085 |
| Melt Viscosity[2] | 45000 | 52000 | 46000 | 34000 |

[1]in chloroform at 20° C.
[2]at 130° C., determined by means of a Koka flow tester
[3]benzylperoxide Properties of Formed DTA Prepolymer 1. Preparation of Filler--Free Compoundd 200 g of the prepolymer prepared in each of the above EXAMPLES and COMPARATIVE EXAMPLES was thoroughly mixed with 4.0 g of dicumyl peroxide in a mortar andd then mulled for 5 min by a roller unit into a sheet; at 100 to 110° C. as a front roll temperature (at 90 to 100° C. for the samples prepared by a solvent-free process, i.e., those prepared in COMPARATIVE EXAMPLES 1 and 4) and 70 to 90° C as a rear roll temperature. The sheet was allowed to cool by standing and then crushed.

2. Compression Molding of Filler-Free Compound

A given quantity of the filler-free compound prepared above was placed in a mold (100×100×3 mm or 15×15×90 mm) for compression molding at 80° C., was heated under a press pressure of about 100 kg/cm² to 125° C. in 30 min, and held thereat for 10 min. The formed article was then withdrawn from the mold, and heated at 150° C. for 10 h in an oven.

Table 4 shows the properties of the formed articles thus prepared.

As shown in Table 4, the formed articles of the DAT of the present invention had better mechanical properties, such as flexural strength.

TABLE 4

|  | Flexural Strength | Flexural Modulus of Elasticity | Heat Deformation Temperature | Shrinkage |
|---|---|---|---|---|
| EXAMPLE 1 | 8.2 (kgf/mm²) | 312 (kgf/mm²) | ≧280° C. | 1.64% |
| EXAMPLE 2 | 7.8 (kgf/mm²) | 326 (kgf/mm²) | ≧280° C. | 1.73% |
| EXAMPLE 3 | 8.7 (kgf/mm²) | 336 (kgf/mm²) | ≧280° C. | 1.75% |
| EXAMPLE 4 | 8.3 (kgf/mm²) | 322 (kgf/mm²) | ≧280° C. | 1.62% |
| EXAMPLE 5 | 6.2 (kgf/mm²) | 339 (kgf/mm²) | ≧280° C. | 1.64% |
| EXAMPLE 6 | 6.8 (kgf/mm²) | 293 (kgf/mm²) | ≧280° C. | 1.73% |
| EXAMPLE 7 | 7.1 (kgf/mm²) | 311 (kgf/mm²) | ≧280° C. | 1.75% |
| EXAMPLE 8 | 7.3 (kgf/mm²) | 308 (kgf/mm²) | ≧280° C. | 1.62% |
| COMPARATIVE EXAMPLE 1 | 4.6 (kgf/mm²) | 286 (kgf/mm²) | ≧280° C. | 1.68% |
| COMPARATIVE EXAMPLE 2 | 4.6 (kgf/mm²) | 254 (kgf/mm²) | ≧280° C. | 1.64% |
| COMPARATIVE EXAMPLE 3 | 4.7 (kgf/mm²) | 282 (kgf/mm²) | ≧280° C. | 1.57% |
| COMPARATIVE EXAMPLE 4 | 4.0 (kgf/mm²) | 265 (kgf/mm²) | ≧280° C. | 1.59% |

We claim:

1. A diallyl terephthalate prepolymer consisting essentially of diallyl terephthalate monomer units, having
   a) 10 or less of carbon bonded units present inn linear portions resulting from the breakage of ester bonds of said prepolymer due to hydrolysis;
   b) an unsaturation in a range off from 40 to 70, as represented by an iodine value determined by the Wijs method,
   c) a number-average molecular weight in a range of from 6,000 to 15,000 as polystyrene, and a weight average molecular weight in a range of from 10,000 to 70,000 as polystyrene, both being determined by gel permeation chromatography, and
   d) a melt viscosity in a range of from 30,000 to 90,000 CP at 170° C., as determined by a Koka flow tester.

2. A diallyl terephthalate prepolymer as set forth in claim 1, wherein the melt viscosity is 50,000 to 90,000 CP.

3. A diallyl terephthalate prepolymer as set forth in claim 1, wherein the weight-average molecular weight is 15,000 to 40,000.

4. A diallyl terephthalate prepolymer as set forth in claim 1, having an intrinsic viscosity of 0.06 to 0.12 measured in chloroform at 20° C.

5. A diallyl terephthalate prepolymer consisting essentially of diallyl terephthalate monomer units, having a) 10 or less of carbon-carbon bonded units present in linear portions resulting from the breakage of ester bonds of said prepolymer due to hydrolysis;
b) an unsaturation in a range of from 50 to 80, as represented by an iodine value determined by the Wijs method,
c) a number-average molecular weight in a range of from 8,000 to 20,000 as polystyrene, and a weight-average molecular weight in a range of from 30,000 to 90,000 as polystyrene, both being determined by gel permeation chromatography, and
d) a melt viscosity in a range of from 20,000 to 90,000 CP at 130° C., as determined by Koka flow tester.

* * * * *